United States Patent
Sakai et al.

(10) Patent No.: US 7,102,975 B2
(45) Date of Patent: Sep. 5, 2006

(54) OPTICAL DISK READ/WRITE APPARATUS AND WRITING METHOD

(75) Inventors: Hiroharu Sakai, Tokyo (JP); Hiroyuki Hayashi, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 503 days.

(21) Appl. No.: 10/676,432

(22) Filed: Sep. 30, 2003

(65) Prior Publication Data
US 2004/0145977 A1 Jul. 29, 2004

(30) Foreign Application Priority Data
Jan. 28, 2003 (JP) .............................. 2003-018363

(51) Int. Cl.
*G11B 7/00* (2006.01)
(52) U.S. Cl. .............................. 369/53.31; 369/53.19; 369/44.32; 369/116
(58) Field of Classification Search ................ None
See application file for complete search history.

(56) References Cited

U.S. PATENT DOCUMENTS

| | | | | |
|---|---|---|---|---|
| 5,216,660 A * | 6/1993 | Iimura | .................... | 369/116 |
| 5,483,512 A * | 1/1996 | Yanagawa | .................. | 369/53.19 |
| 5,841,747 A * | 11/1998 | Kubota et al. | ............... | 369/116 |
| 5,903,537 A * | 5/1999 | Gage et al. | ................... | 369/116 |
| 6,560,178 B1 * | 5/2003 | Lee et al. | ................. | 369/53.19 |
| 6,600,712 B1 * | 7/2003 | Masui et al. | ................. | 369/116 |
| 6,940,797 B1 * | 9/2005 | Lee et al. | ................. | 369/53.19 |
| 6,975,574 B1 * | 12/2005 | Yanagawa et al. | ........ | 369/53.19 |

FOREIGN PATENT DOCUMENTS

| | | |
|---|---|---|
| JP | 2001-184689 | 7/2001 |
| JP | 2002-074671 | 3/2002 |

* cited by examiner

Primary Examiner—Thang V. Tran
(74) Attorney, Agent, or Firm—Townsend and Townsend and Crew LLP

(57) ABSTRACT

An optical disk read/write apparatus detects a shift in the tilt during a write operation and corrects it before resuming the write operation. Specifically, when the ROPC control signal detector of the optical disk read/write apparatus controlling the write power determines that the write power has exceeded a predetermined value after a control operation, the optical disk read/write apparatus suspends the write operation through control of the laser power and controls the shift in the tilt with the tilt controller before resuming the write operation.

8 Claims, 4 Drawing Sheets

FIG.4
(a)
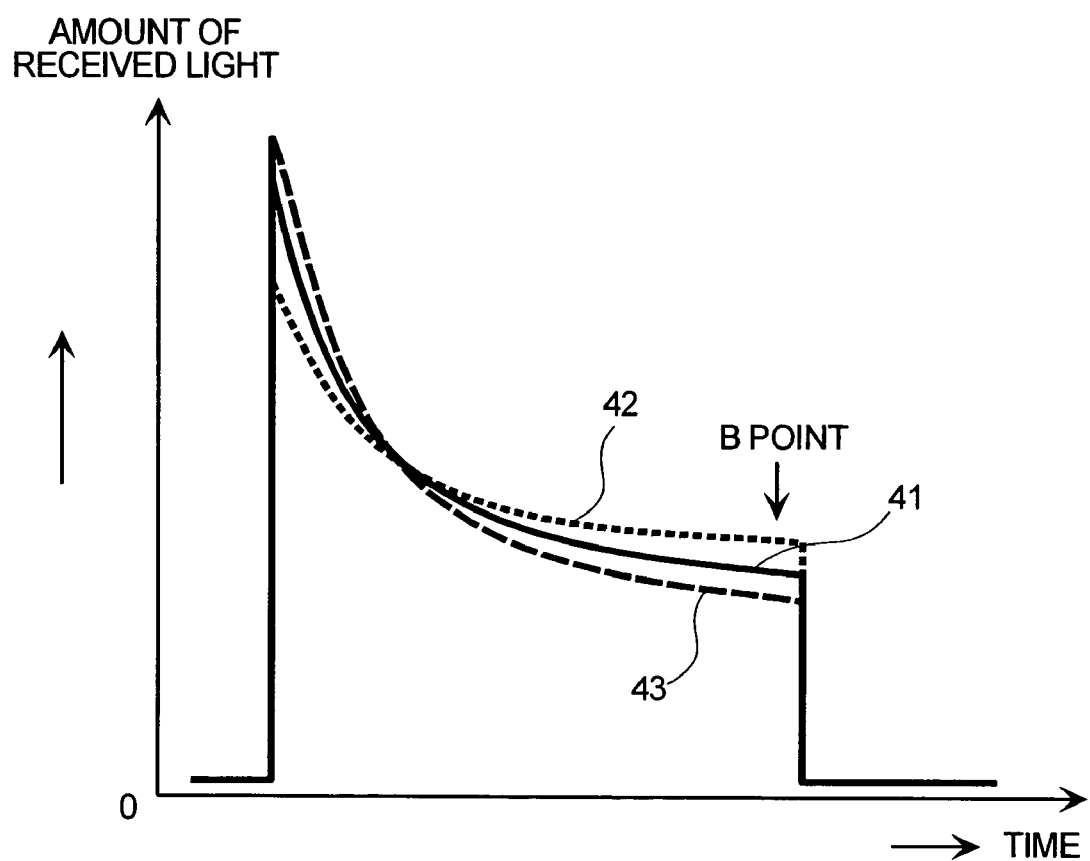
(b)
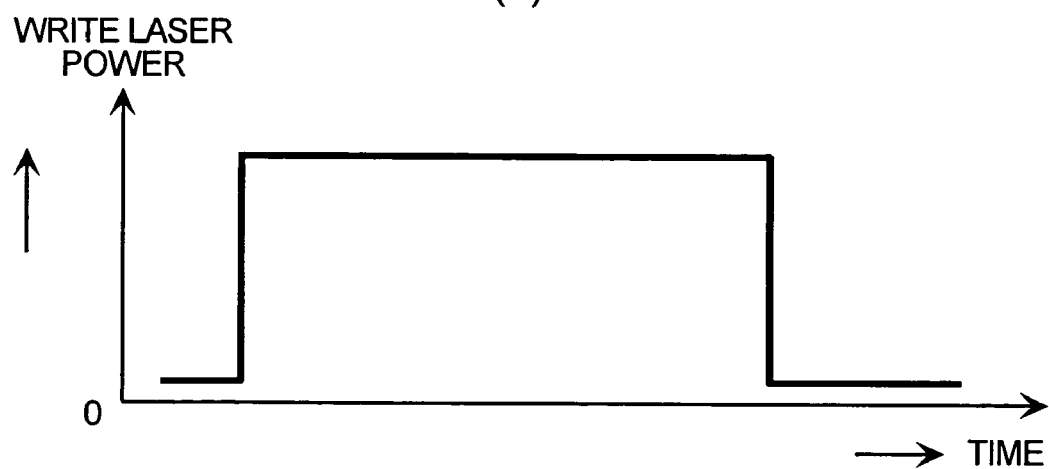

OPTICAL DISK READ/WRITE APPARATUS AND WRITING METHOD

BACKGROUND OF THE INVENTION

The present invention relates to an optical disk read/write apparatus and a writing method, and more particularly to a technique applied to Running Optimum Power Control (ROPC). ROPC controls a semiconductor laser to obtain optimum laser power while writing to a writable optical disk to prevent the ROPC from becoming uncontrollable due to the influence of the tilt of the optical disk. The technique detects an inappropriate tilt angle based on the optical power of the laser used by the ROPC and performs tilt control before resuming the ROPC operation.

When writing data on a writable optical disk such as a CD-R using a laser beam, a trial write operation is performed on the power calibration area (PCA) provided for trial write operations on the inner circumferential side of the lead-in area of each optical disk. Here, comprehensive evaluations check the influence of variations in sensitivity of the optical disk, in laser characteristics of the optical pickup, in precision of the lens assembly, and in write speed.

In the trial write operation (power calibration), test data is written while changing the write speed and the write power of the laser in a stepwise manner. When the test data is read, the asymmetry ($\beta$) between the signals from the pit portions and the groove portions is evaluated, and write power exhibiting a good asymmetry level is designated as optimum writing power.

During the actual write operation, the write laser power is controlled to be at optimum power level, thereby optimizing the asymmetry of the reflected light (write pulse signals) from the optical disk, to accommodate variations in the optimum write power due to fluctuations in the sensitivity of the optical disk, shifts in the laser wavelength attributed to temperature changes, changes in the tilt of the optical disk, etc. This control operation is referred to as Running Optimum Power Control (ROPC).

FIGS. 4(a) and 4(b) are characteristic curves of the amount of received light reflected from an optical disk and the write laser power, respectively. FIG. 4(a) shows changes in the amount of received light over time, while FIG. 4(b) shows changes in the write laser power over time. When laser power as shown in FIG. 4(b) is used to irradiate laser light to a writable optical disk in a write operation, the amount of reflected light received changes as shown in FIG. 4(a) in the write operation. In the figure, characteristic curve 41 represents the amount of light received with an appropriate write laser power level. Characteristic curve 42 represents the amount of light received with an insufficient write laser power level; and characteristic curve 43 represents the amount of light received when the write laser power is too great. As can be seen from these characteristic curves, the output (B level) at point B decreases with increasing write power and increases as the write power decreases. The asymmetry of each signal at point B is evaluated to optimize the write power.

Conventional tilt control methods in which the tilt of an optical disk is corrected by use of a tilt sensor, have historically had the problem of being unable to control the tilt during write operation. For example, one technique has been disclosed in which returned laser light reflected from the optical disk is photoelectrically converted into an RF signal by a photoreceptor. The signal is used to adjust the tilt of the optical disk during a write operation (see page 1 of Japanese Patent Laid-Open 2001-184689).

Further, an increasing number of optical disk devices have been applied to portable equipment. In the case where an optical disk device is incorporated in a camera, for example, a large and instantaneous change in the tilt of the optical disk occurs due to the Coriolis force when the camera is panned, and this state can be sensed. A technique using this change has been disclosed in which a circuit for determining the total amount of light on the photoreceptor within the optical pickup is provided to control the write operation to the optical disk (see page 3 of Japanese Patent Laid-Open No. 2002-74671).

BRIEF SUMMARY OF THE INVENTION

The write speed of optical disk devices has increased and 16X and 24X drives have been put into general practical use, presenting more severe write conditions. Furthermore, "printable disks," which are CD-R disks pasted with a printing label, have recently come into wide use. Since this type of optical disk exhibits a shift in its tilt when the printing is done, tilt shifts larger than those traditionally produced have sometimes been observed.

Even with such disks, pits of a desired depth can be formed by use of the increased write power brought about by the ROPC control if their tilt shift is within a certain level. However, if their tilt exceeds that level, the writing quality cannot be maintained even when pits of a desired depth are formed by optimizing the power, since the write operation is performed with laser light incident at an angle. Therefore, a new control method must be devised capable of ensuring the writing quality even with disks having a tilt shift which is too large to maintain the writing quality by use of the ROPC control alone.

This invention provides a technique for maintaining good writing quality, whereby when set laser power under ROPC control has changed to such an extent that it exceeds a threshold value set as a drive current, the write operation is suspended. This determination that the tilt shift is too large to maintain the writing quality triggers adjustment of the of the optical disk. According to one aspect of the present invention, an optical disk read/write apparatus which controls laser write power such that a signal obtained from light reflected from an optical disk during a write operation at a predetermined value includes an optical pickup including a laser; a laser power determining apparatus that determines whether the laser write power has exceeded a predetermined value; a controller that suspends the write operation if the laser power exceeds the predetermined value; an optical pickup control that controls a tilt angle of the optical pickup while the write operation is suspended; and apparatus for resuming the write operation after the tilt angle has been controlled.

According to another aspect of the present invention, a writing method comprises the steps of: controlling laser write power such that a signal obtained from light reflected from an optical disk during a write operation is at a predetermined value; suspending the write operation and establishing a read state when the laser write power exceeds the predetermined value; controlling a tilt angle of an optical pickup in the read state; and resuming the write operation. If it is determined that a tilt shift too large to maintain the write quality has occurred, the present invention suspends the write operation and adjusts the tilt shift before resuming the write operation, making it possible to establish a favorable write state.

BRIEF DESCRIPTION OF THE DRAWINGS

FIGS. 4(a) and 4(b) are characteristic curves of the amounts of received light reflected from an optical disk and the write laser power, respectively.

DETAILED DESCRIPTION OF THE INVENTION

Figure 2:
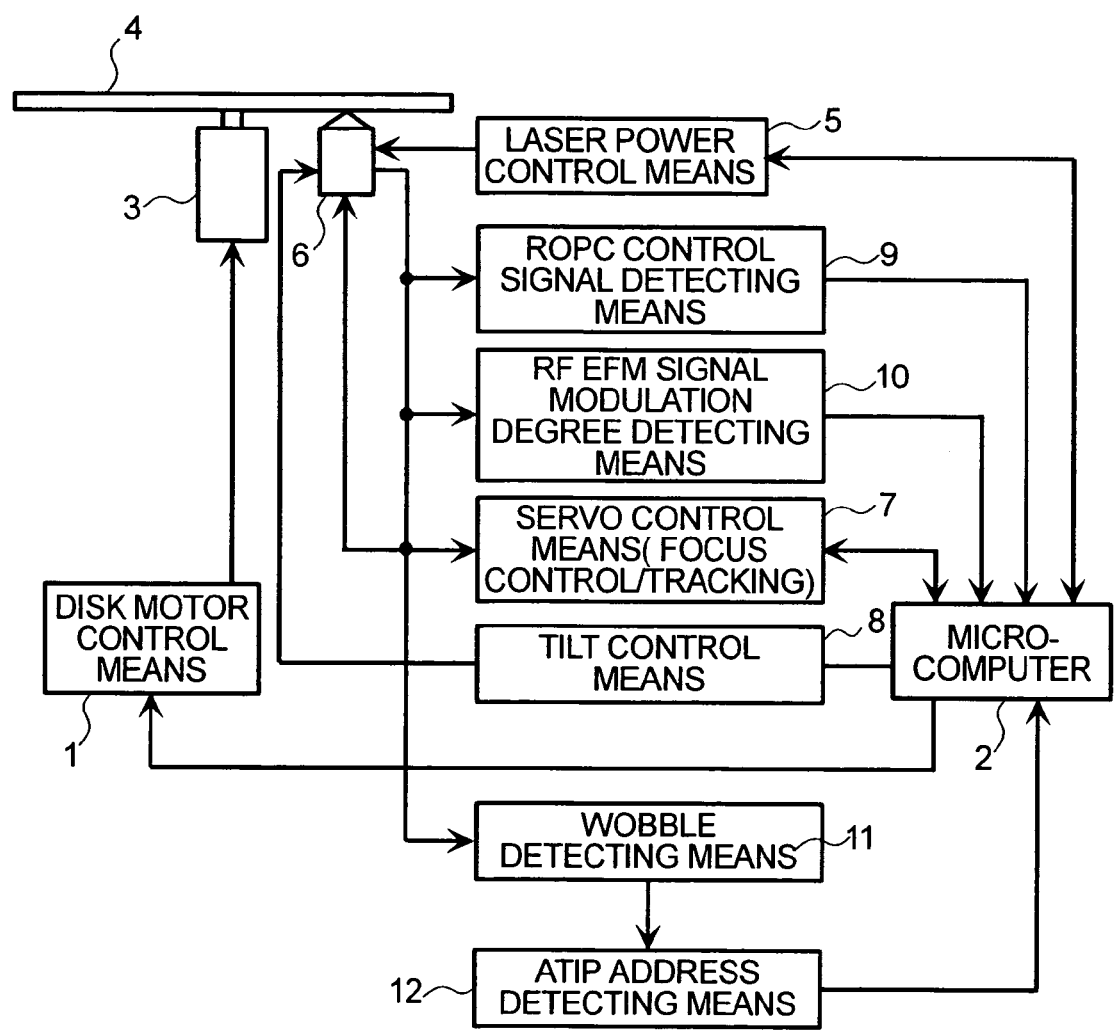
FIG. 2 is a block diagram showing an optical disk read/write apparatus according to an embodiment of the present invention.

Preferred embodiments of the present invention are described next with reference to the accompanying drawings. FIG. 2 is a block diagram showing an optical disk read/write apparatus according to an embodiment of the present invention. In the figure, a disk motor control 1 controls a disk motor 3 such that disk motor 3 rotates at a rotational speed indicated by a microcomputer 2. Disk motor 3 rotates an optical disk 4 at an arbitrary rotational speed. A laser power control 5 controls the laser power of an optical pickup 6 such that the laser power is at a power level indicated by microcomputer 2. Optical pickup 6 focuses laser light onto optical disk 4 to carry out information write operation. Furthermore, optical pickup 6 detects information written on optical disk 4 as optical information and converts it into an electric signal.

A servo control 7 extracts the information necessary for optical pickup 6 to track disk information grooves from the electric signal supplied from optical pickup 6, controls the focus of optical pickup 6 based on the extracted information, and carries out tracking operation. A tilt control means 8 controls the optical pickup 6 such that it is set to any tilt angle indicated by microcomputer 2.

A ROPC control signal detector 9 detects information (such as the B level) indicating whether the write laser power level is too high or too low (or appropriate) from the electric signal supplied from optical pickup 6. Microcomputer 2 corrects the laser power through laser power control means 5 based on the B level, obtained by ROPC control signal detector 9 during the write operation. That is, microcomputer 2 performs ROPC control.

An RF EFM signal modulation degree detector 10 detects the modulation degree of an EFM signal. The tilt is controlled according to the output of signal modulation degree detector 10. A wobble detector 11 detects a wobble signal from the electric signal from optical pickup 6. Absolute Time In Pre-Groove (ATIP) address detector 12 obtains ATIP address information from the wobble signal detected by wobble detector 11.

Disk motor control 1, laser power control 5, servo control 7, tilt control 8, ROPC control detector 9, RF EFM modulation degree detector 10 and wobble detector 11 may be hardware such as circuits and/or software such as programs installed in microcomputer 2. There are no structural limitations on these detectors and controllers, provided they accomplish their functions.

Figure 1:
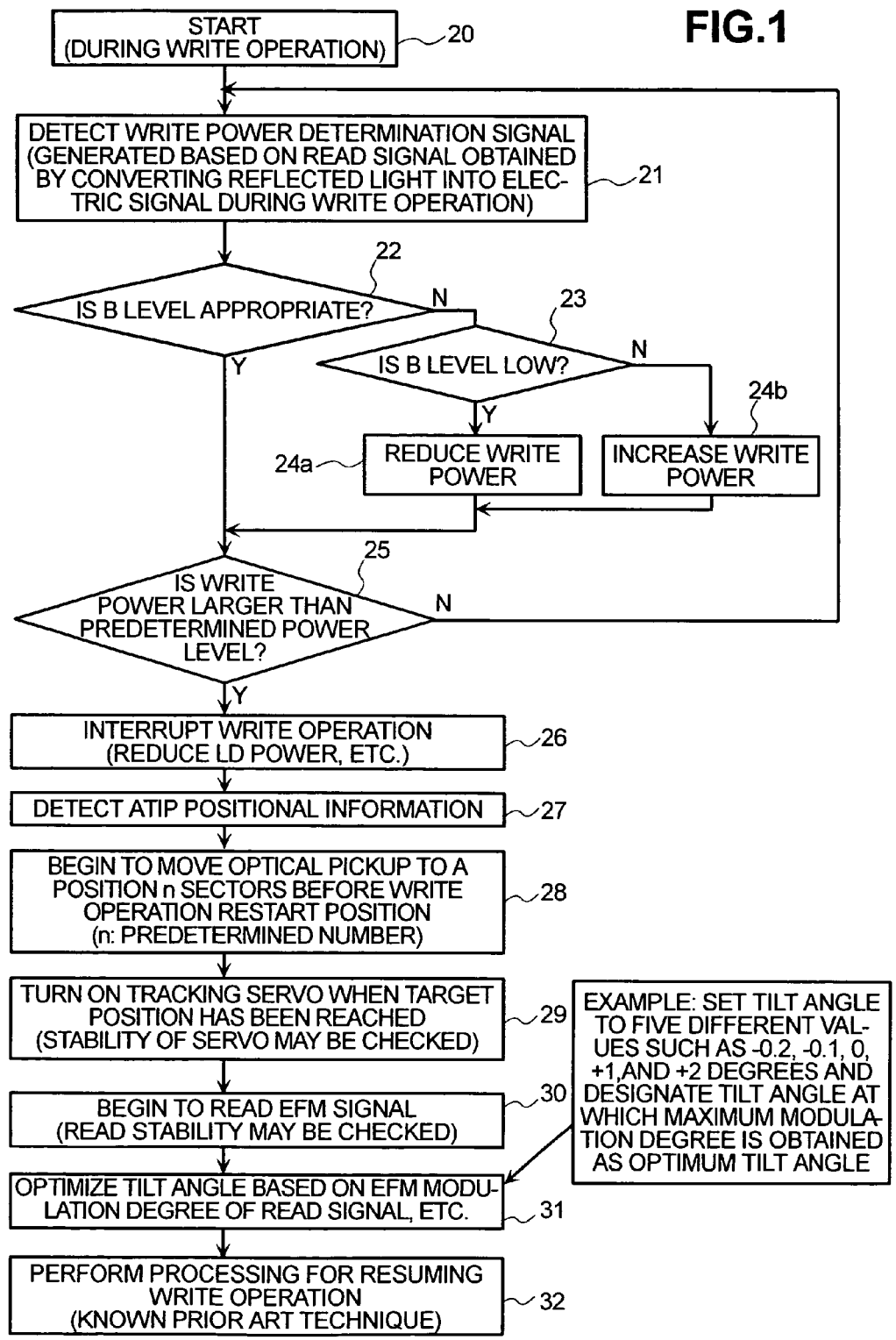
FIG. 1 is a flowchart showing the write operation suspending processing when the write power has exceeded a predetermined power level under ROPC control, according to an embodiment of the present invention.

A description follows of the suspension of write operation processing when the write power has exceeded a predetermined power level (threshold value) under ROPC control in the optical disk read/write apparatus shown in FIG. 1. FIG. 1 is a flowchart showing suspension of write operation processing when the write power exceeds a predetermined power level under ROPC control, according to an embodiment of the present invention. The flowchart begins at step 20 in which a write operation is being carried out. At step 21, ROPC control signal detector 9 shown in FIG. 2 detects a write power determination signal from the read signal shown in FIG. 4. For example, the B level (signal) obtained as a result of converting the reflected light from the optical disk into an electric signal during the write operation is used as the write power determination signal. The ROPC controls the write power so that the B level is at a predetermined value. At step 22, microcomputer 2 determines whether the B level is at an appropriate value. If not (indicated by character N), the processing proceeds to step 23 where it is determined whether the B level is low. If the B level is low (that is, the write power is high), processing proceeds to step 24a where the write power is reduced by a predetermined amount according to an instruction from microcomputer 2. After that, the processing proceeds to step 25. If, at step 23, the B level is high (that is, the write power is lower than a predetermined power level), the processing proceeds to step 24b where the write power is increased by a predetermined amount according to an instruction from microcomputer 2, and then the processing proceeds to step 25.

At step 25, it is determined whether the write power has exceeded a predetermined power level. For example, since the write power is output from laser power controller 5 according to an instruction from microcomputer 2, microcomputer 2 can determine whether the write power has exceeded the predetermined power level. If the write power has exceeded the predetermined power level, processing proceeds to step 26. If the write power is within the predetermined power level, processing returns to step 21.

Figure 3:
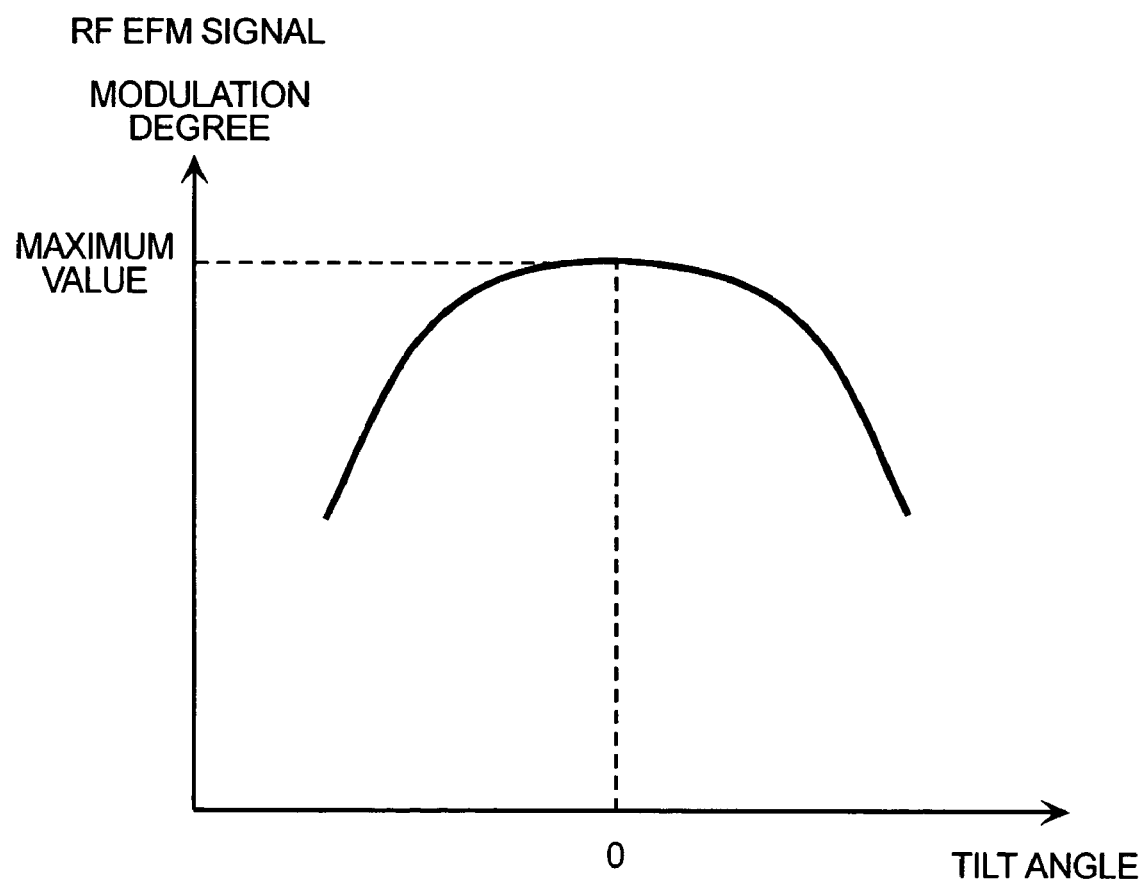
FIG. 3 is a characteristic curve depicting the relationship between the tilt angle and the modulation degree of the radio frequency eight-to-fourteen modulation (RF EFM) signal.

Specifically, if the write power has exceeded the predetermined power level, write operation processing is suspended at step 26 by reducing the laser power, for example. In this case, the write laser power is reduced to a laser power level for a read operation (that is, a read state is assumed). At step 27, ATIP address detector 12 identifies ATIP positional information using a wobble signal detected by wobble detector 11. At step 28, the optical pickup is moved to a written sector at a position n sectors before the position at which the write operation has been suspended (n is a predetermined number). At step 29, the tracking servo is turned on when the optical pickup has reached the position n sectors before the write operation restart position. At step 30, the EFM signal begins to be read. At step 31, RF EFM signal modulation degree detector 10 supplies information about the EFM modulation degree to microcomputer 2 which then changes the tilt angle of optical pickup 6 through tilt control means 8 so that it is adjusted to the tilt angle at which the RF EFM modulation degree is maximized as shown in FIG. 3. It should be noted that another detector may be used to optimize the tilt. At step 32, processing for resuming the write operation is carried out, starting the ROPC again. It should be noted that a conventional buffer under run resume processing technique may be employed for this resume write operation processing.

FIG. 3 is a characteristic curve depicting the relationship between the tilt angle and the modulation degree of the RF EFM signal, wherein the horizontal axis indicates the tilt angle and the vertical axis indicates the modulation degree of the RF EFM signal. As shown in the figure, the modulation degree of the RF EFM signal is maximized at a tilt angle of 0 degree; the modulation degree of the RF EFM signal decreases as the tilt angle is increased or decreased from 0 degree. Therefore, the tilt angle is adjusted by adjusting the angle of the optical pickup itself, or the objective lens of the optical pickup, so that the modulation degree of the RF EFM signal is maximized.

As described above, when the write laser power is controlled by use of ROPC so that the B level is at a predetermined value, if the write power has exceeded a predetermined power level, the present invention determines that the tilt of the optical disk has become larger than a predetermined value. Thus, when the write power has increased to a power level higher than a predetermined level, the present invention determines that the tilt has shifted by more than a predetermined amount, suspends the write operation, and corrects the tilt before resuming the write operation, making it possible to establish a favorable write state. A person of skill in the art will appreciate that the invention makes it possible to prevent the write power from exceeding a predetermined power level under ROPC control.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical disk read/write apparatus which controls write laser power such that a signal obtained from light reflected from an optical disk during a write operation is at a predetermined value, the optical disk read/write apparatus comprising:
   an optical pickup including a laser;
   a laser power detector for determining whether the write laser power has exceeds a predetermined value;
   a controller for suspending the write operation when the laser power detector determines that the write laser power has exceeded the predetermined value;
   an optical pickup controller for controlling a tilt angle of the optical pickup while the write operation is under suspension; and
   a controller for resuming the write operation after the tilt angle has been controlled.

2. The optical disk read/write apparatus as claimed in claim 1, further comprising:
   apparatus for establishing a read state and detecting positional information after suspension of a write operation; and
   a controller for moving the optical pickup to a position a predetermined number of sectors before a position at which the write operation was suspended.

3. The optical disk read/write apparatus as claimed in claim 2, further comprising a detector for turning on a tracking servo after the optical pickup has moved to the position the predetermined number of sectors before the position at which the write operation has been suspended.

4. The optical disk read/write apparatus as claimed in claim 1, wherein the optical pickup controller comprises:
   EFM signal modulation degree detector; and
   A tilt controller for controlling the tilt angle of the optical pickup such that a modulation degree of an EFM signal detected by the EFM signal modulation degree detector is increased.

5. A writing method comprising the steps of:
   controlling write laser power such that a signal obtained from light reflected from an optical disk during a write operation is generally at a predetermined value;
   suspending the write operation and establishing a read state when the write laser power exceeds the predetermined value;
   controlling a tilt angle of an optical pickup in the read state; and
   resuming the write operation.

6. The writing method as claimed in claim 5, further comprising steps of:
   detecting a current position in the read state; and
   moving the optical pickup to a position a predetermined number of sectors before a position at which the write operation has been suspended.

7. The writing method as claimed in claim 6, further comprising a step of turning on a tracking servo after the optical pickup has been moved to the position the predetermined number of sectors before the position at which the write operation has been suspended.

8. The writing method as claimed in claim 5, wherein the step of controlling the tilt angle of the optical pickup includes steps of:
   reading an EFM signal; and
   controlling the tilt angle of the optical pickup such that a modulation degree of the EFM signal is maximized.

* * * * *